United States Patent [19]

Yeh

[11] Patent Number: 5,716,690

[45] Date of Patent: Feb. 10, 1998

[54] COMPOSITE FURNITURE LEG

[76] Inventor: Don-Fong Yeh, 8F, No. 65, Sung-Chiang Rd., Chung-Shan Dist., Taipei City, Taiwan

[21] Appl. No.: 569,491

[22] Filed: Dec. 8, 1995

[51] Int. Cl.[6] .............................. B32B 21/02; B32B 21/04
[52] U.S. Cl. ...................... 428/106; 428/534; 428/536; 428/537.1; 248/188
[58] Field of Search ..................... 428/534, 536, 428/537.1, 106; 156/62.2, 62.8; 248/188, 188.1, 188.4, 188.8; 5/310; 108/156

[56] References Cited

U.S. PATENT DOCUMENTS

| | | |
|---|---|---|
| 3,793,125 | 2/1974 | Kunz ........................... 156/62.2 |
| 3,846,211 | 11/1974 | Begin et al. ........................ 161/7 |
| 5,106,666 | 4/1992 | Fitzgerald et al. ................. 428/67 |
| 5,163,373 | 11/1992 | Anderson et al. ................ 108/153 |
| 5,275,862 | 1/1994 | Ramadan et al. ................ 428/113 |
| 5,441,787 | 8/1995 | Fujii et al. ........................ 428/57 |

*Primary Examiner*—Stevan A. Resan
*Assistant Examiner*—Holly C. Rickman
*Attorney, Agent, or Firm*—Ladas & Parry

[57] ABSTRACT

A composite furniture leg includes an elongate molded core body having outer and inner sides, a hard wood reinforcing block embedded in a top part of the core body at the inner side of the core body, an outer laminate shell layer for covering the outer side of the core body, and an inner wood cover layer for covering the inner side of the core body. The core body, the outer shell layer and the inner cover layer are hot pressed to form the furniture leg.

18 Claims, 7 Drawing Sheets

COMPOSITE FURNITURE LEG

BACKGROUND OF THE INVENTION

1. Field of the Invention

The invention relates to a furniture leg, more particularly to a composite furniture leg which is environmental friendly and which is relatively easy to fabricate and install.

2. Description of the Related Art

Conventional furnitures are usually made of wood. However, in view of the current emphasis on environmental protection, there is always a need to find other materials that can serve as a substitute for wood in the furniture industry.

Figure 1:
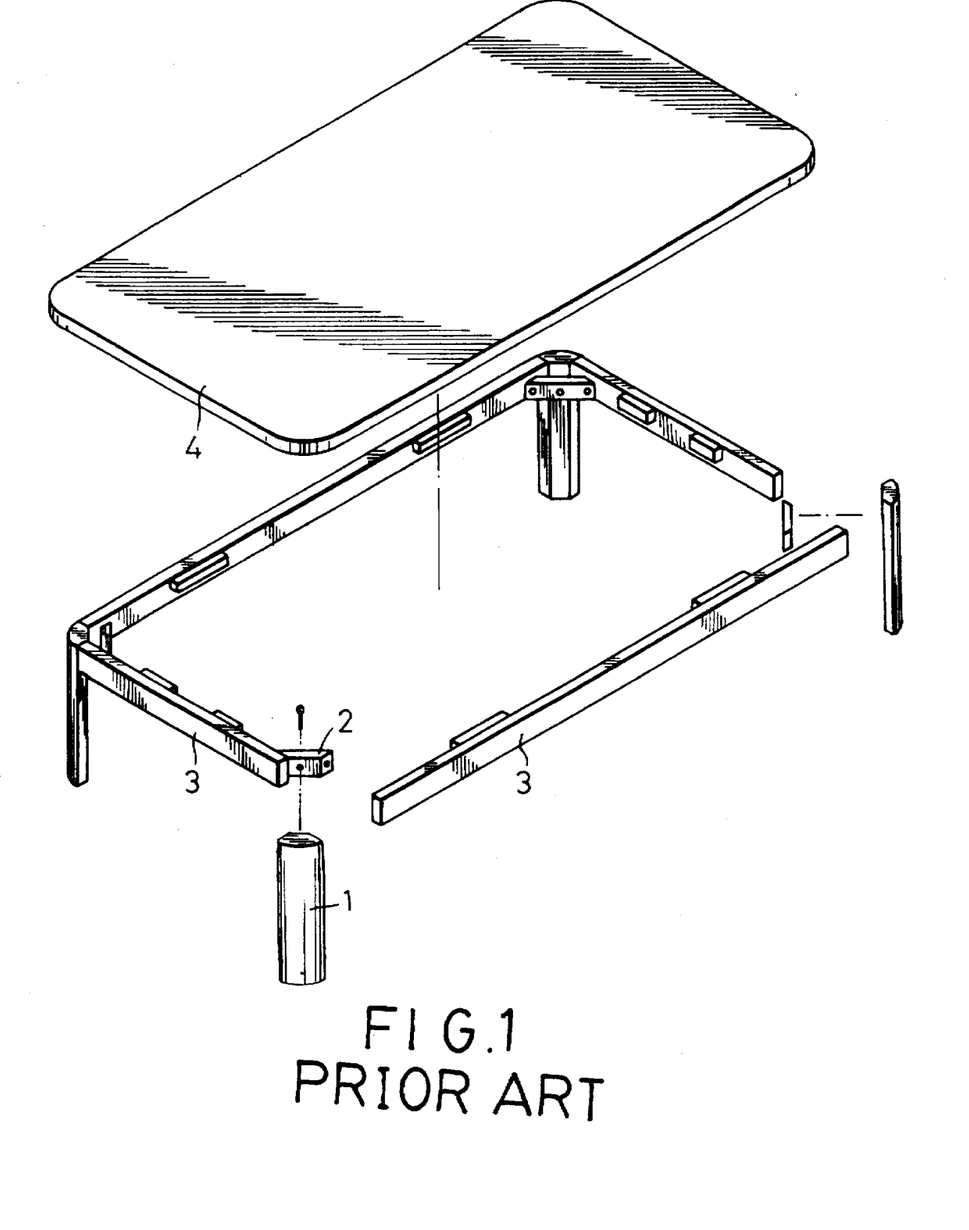
FIG. 1 is an exploded view of a conventional wooden table.

Referring to FIG. 1, a conventional wooden table is shown to comprise four table legs 1. Each of the table legs 1 has a top end with a connecting block 2 mounted thereon. The two ends of the connecting block 2 are mounted respectively on a pair of aprons 3. A table top 4 is mounted on top of the aprons 3.

Since the conventional table legs 1 are made entirely of wood, the material cost of the table legs 1 is relatively high due to the limited supply of lumber. In addition, the table legs 1 have to undergo numerous operations so as to attain the desired shape and appearance, thereby resulting in a very slow manufacturing process and in a relatively high manufacturing cost. Moreover, the table legs 1 are inconvenient to install since they are normally secured to the connecting blocks 2 with the use of screws. Furthermore, the boring of screw holes in the table legs 1 may weaken and damage the table legs 1.

SUMMARY OF THE INVENTION

Therefore, the main object of the present invention is to provide a composite furniture leg which has a relatively inexpensive material cost and which can be conveniently processed so as to attain the desired shape and appearance, thereby resulting in a relatively low manufacturing cost.

Another object of the present invention is to provide a composite furniture leg which can be easily connected to other furniture parts.

Accordingly, the preferred embodiment of a composite furniture leg of the present invention comprises an elongate molded core body, a reinforcing block, an outer shell layer and an inner cover layer. The core body has outer and inner sides and is formed by hot pressing a mixture of wood chips and a resinous binder. The reinforcing block is embedded in a top part of the core body at the inner side of the core body and is made of a hard wood material. The outer shell layer is used to cover the outer side of the core body and is formed by hot pressing a laminate which includes a substrate sheet and a reinforcing sheet bonded to an inner side of the substrate sheet. The substrate sheet and the reinforcing sheet are made of wood. The inner cover layer is made of wood and is used to cover the inner side of the core body. The core body, the outer shell layer and the inner cover layer are hot pressed to form the furniture leg.

Preferably, the outer side of the core body has a curved longitudinal central portion and a pair of curved longitudinal shoulders on opposite sides of the central portion, while the inner side of the core body is curved. The reinforcing block has at least one screw socket embedded therein. The reinforcing sheet includes crisscrossing and adhesively secured strips having grains that are transverse to each other.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 2:
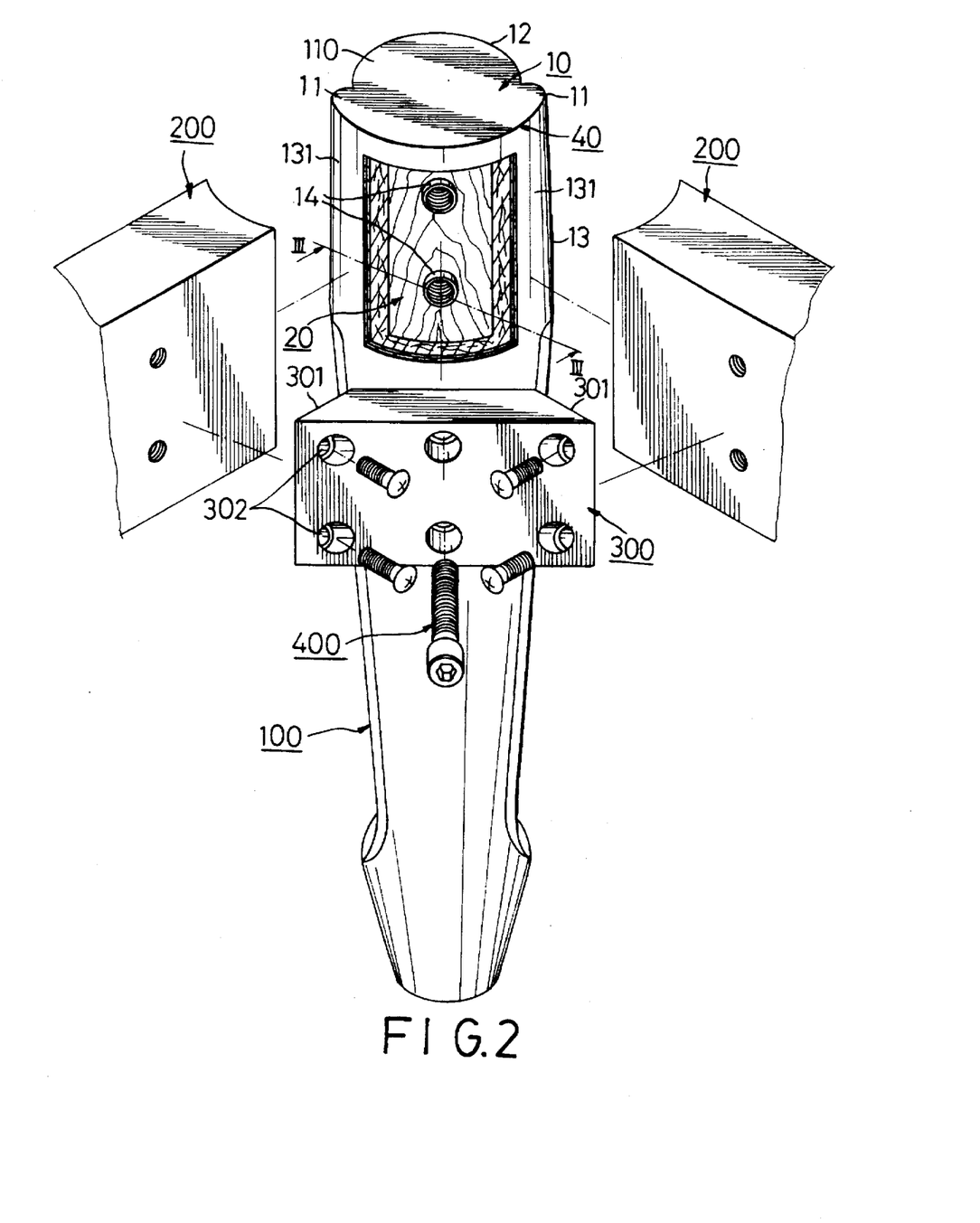
FIG. 2 is a perspective view illustrating how the preferred embodiment of a composite furniture leg according to the present invention is connected to other furniture parts.
Figure 3:
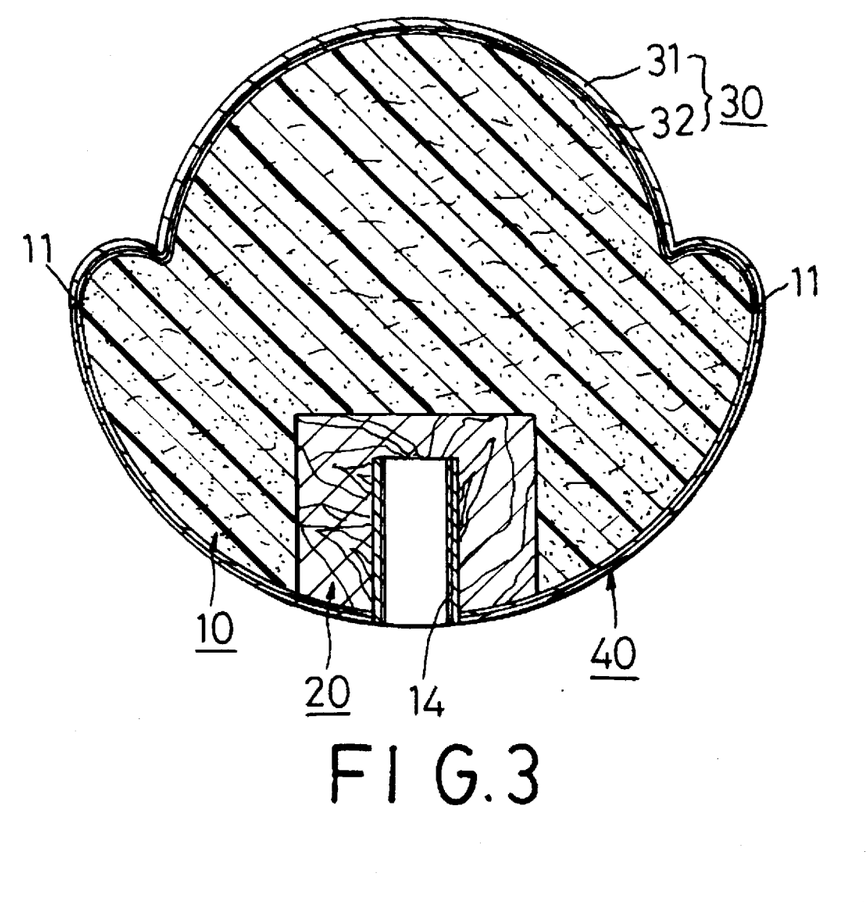
FIG. 3 is a sectional view of the preferred embodiment, taken along line III—III in FIG. 2.

Referring to FIGS. 2 and 3, the preferred embodiment of a composite furniture leg 100 according to the present invention is shown to comprise an elongate molded core body 10, a reinforcing block 20, an outer shell layer 30 and an inner cover layer 40.

The molded core body 10 is formed by hot pressing a mixture of wood chips and a resinous binder, such as melamine resin, in a mold. The core body 10 has an outer side 12 with a curved longitudinal central portion 110 and a pair of curved longitudinal shoulders 11 on opposite sides of the central portion 110. The core body 10 further has a curved inner side 13. Preferably, the outer side 12 is formed with an embossed pattern (not shown).

Figure 5:
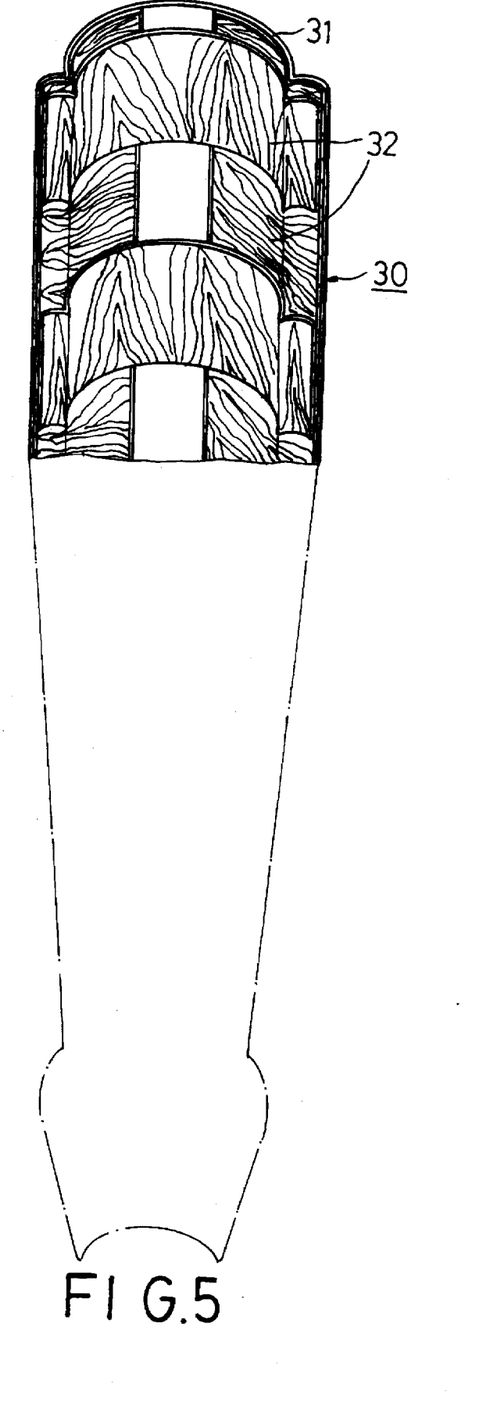
FIG. 5 is a schematic, partially cutaway view of the preferred embodiment.

Referring to FIGS. 3 and 5, the reinforcing block 20, which is preferably made of a hard wood material, is placed in the mold before the mixture of wood chips and the resinous binder is poured into the same when forming the core body 10. Thus, the reinforcing block 20 can be embedded in a top part of the core body 10 at the inner side 13 when the core body 10 is formed. The reinforcing block 20 has a pair of screw sockets 14 embedded therein in a known manner. The inner side 13 of the core body 10 has a pair of abutment surfaces 131 on opposite sides of the reinforcing block 20.

The outer shell layer 30 is formed as a rigid shell which is used to cover the outer side 12 of the core body 10 and which is formed by hot pressing a laminate in a mold similar to that used when forming the core body 10, thereby forming the outer shell layer 30 with the embossed pattern found on the outer side 12 of the core body 10. The laminate includes a substrate sheet 31 and a reinforcing sheet 32 bonded to an inner side of the substrate sheet 31 and made of a same material as the substrate sheet 31. In this embodiment, the substrate sheet 31 may be a thin dry or wet wooden plate. The reinforcing sheet 32 includes crisscrossing and adhesively secured strips made from 'scrap wood material. Preferably, the grains of the wood strips are transverse to each other.

The inner cover layer 40 is made from a thin wooden plate and is used to cover the inner side 13 of the core body 10. After the core body 10 has been enclosed and bonded to the outer shell layer 30 and the inner cover layer 40 with the use of an adhesive, the combination of the core body 10, the outer shell layer 30 and the inner cover layer 40 undergo hot pressing in a mold so as to form the furniture leg 100.

Figure 4:
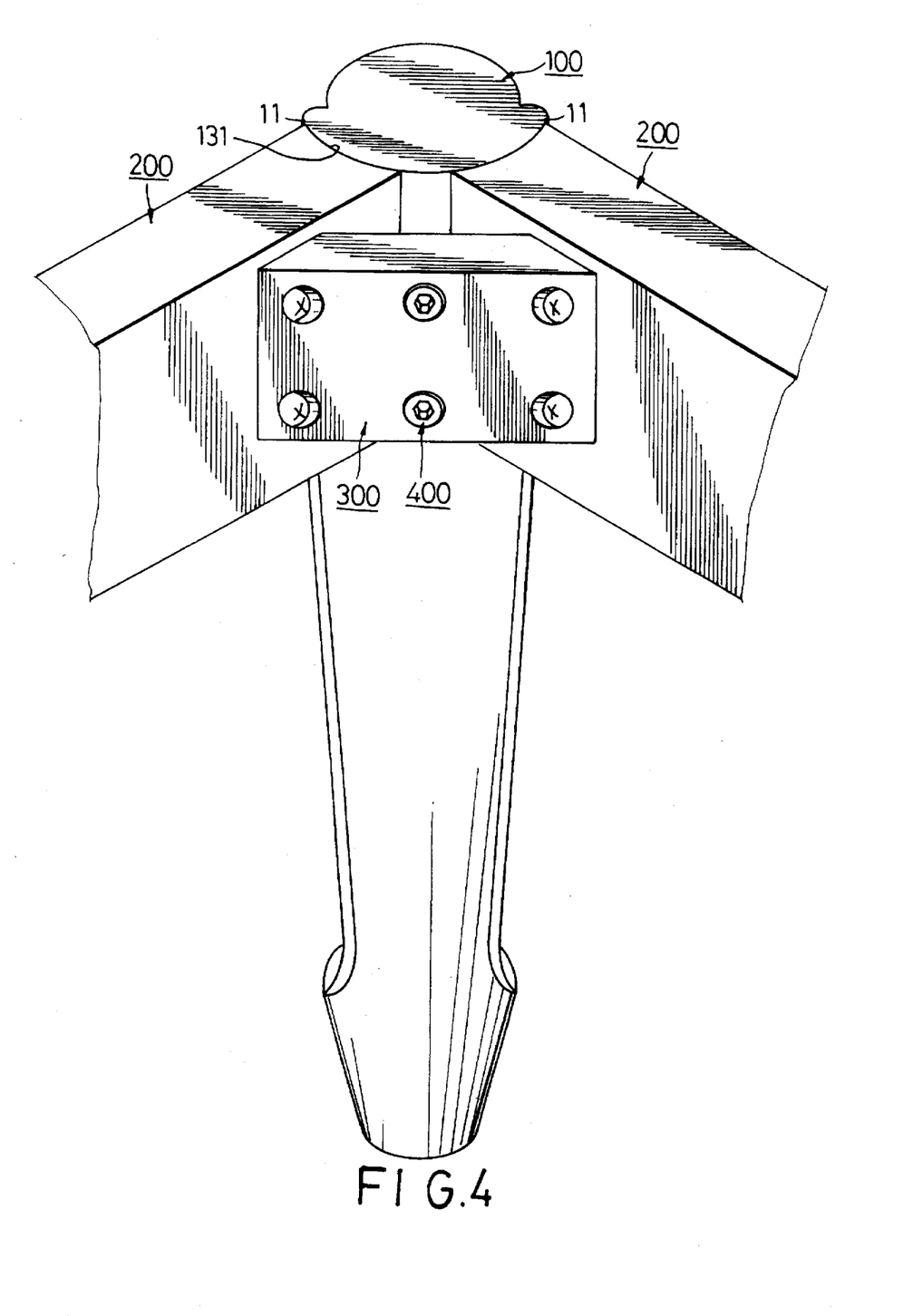
FIG. 4 is a perspective view illustrating the preferred embodiment when connected to other furniture parts.

Referring to FIGS. 2 and 4, when connecting the furniture leg 100 of the preferred embodiment to other furniture parts so as to form a table, the distal end portions of two aprons 200 are positioned so as to abut respectively against the abutment surfaces 131 on the inner side 13 of the core body 10. The shoulders 11 facilitate proper positioning of the aprons 200 relative to the inner side 13 of the core body 10. A connecting block 300 is disposed between the aprons 200 and has two inclined faces 301 which abut respectively against the aprons 200. The connecting block 300 is formed with six through-holes 302 which permit the passage of six bolts 400 therethrough. Four of the bolts 400 mount the connecting block 300 to the aprons 200. Two of the bolts 400 engage the screw sockets 14 in the reinforcing block 20, thereby mounting the connecting block 300 to the furniture leg 100.

Figure 6:
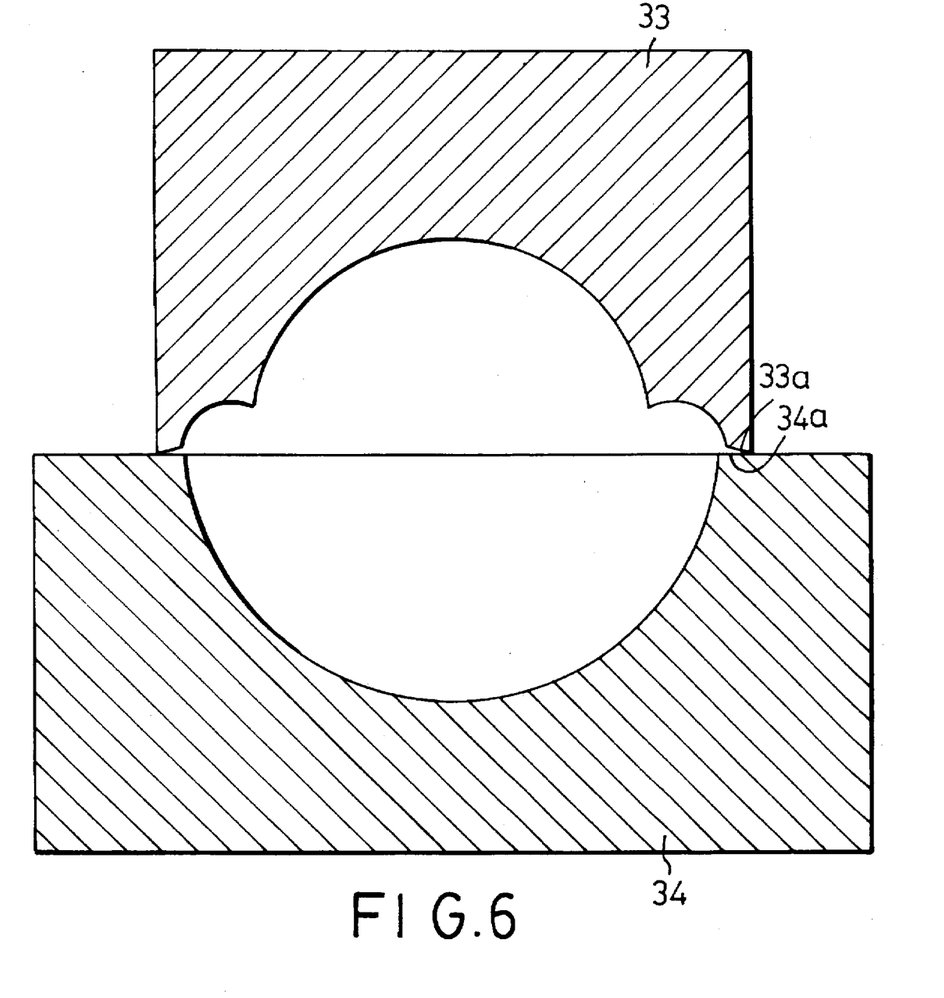
FIG. 6 is a schematic view illustrating upper and lower mold halves of a mold used in the manufacture of the preferred embodiment.
Figure 7:
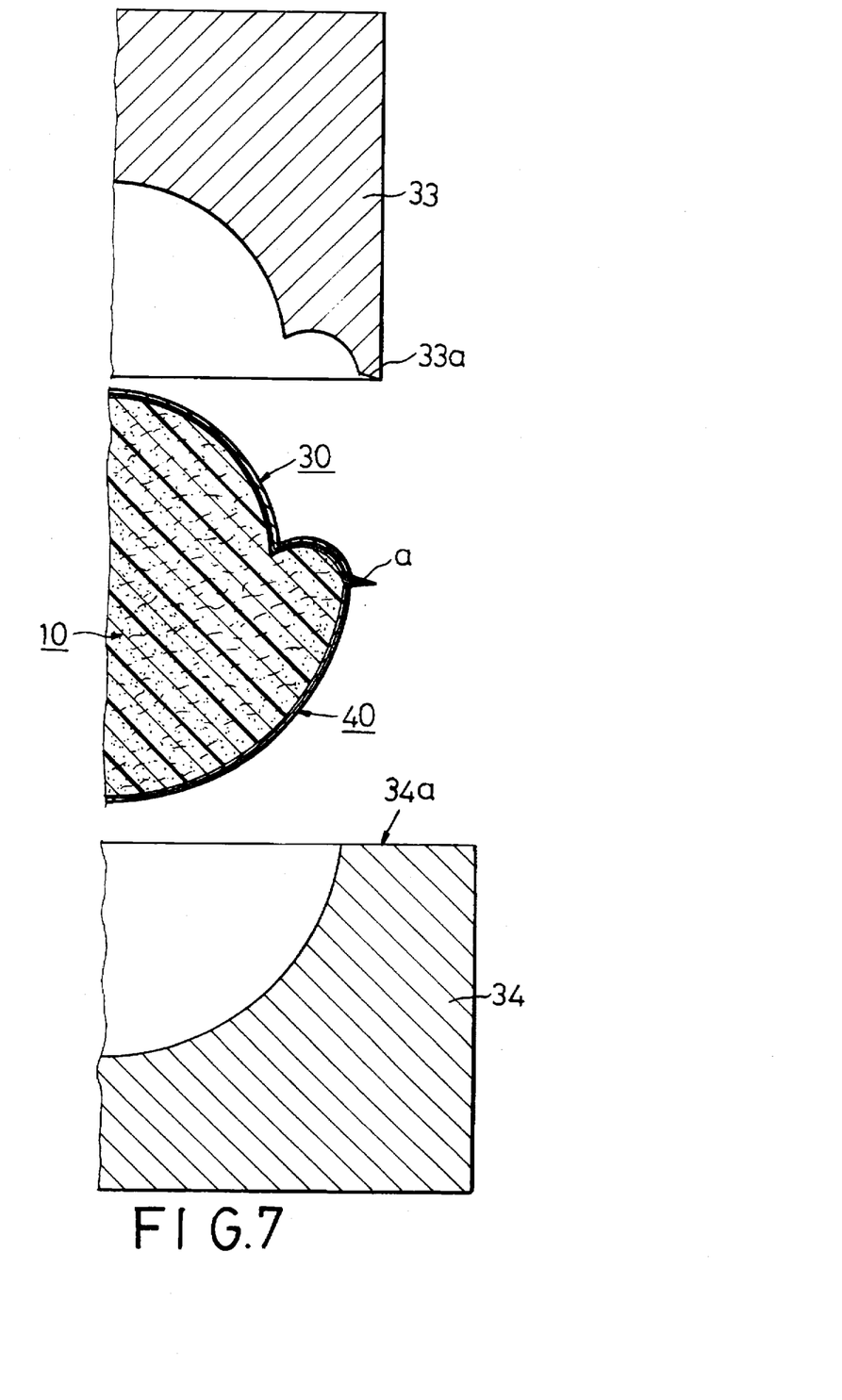
FIG. 7 is a schematic view which illustrates how the mold of FIG. 6 trims an excess portion of an inner cover layer of the preferred embodiment.

FIG. 6 illustrates upper and lower mold halves 33, 34 of a mold that is used when forming the furniture leg 100. The upper mold half 33 has a lower end portion formed with an inclined edge 33a. The lower mold half 34 confines a mold cavity with an upper end portion which is formed with a flat periphery 34a that complements the inclined edge 33a of the upper mold half 33. Referring to FIG. 7, when forming the furniture leg 100, the inner cover layer 40 is initially larger than the core body 10 to ensure that the inner cover layer 40 can cover completely the inner side 13 of the core body 10. When the core body 10, the outer shell layer 30 and the inner cover layer 40 undergo hot pressing in the mold, the inclined edge 33a and the flat periphery 34a of the mold halves 30, 40 trim the excess portion (a) of the inner cover layer 40 to maintain the high quality appearance of the furniture leg 100.

The advantages and characterizing features of the furniture leg 100 according to the present invention are as follows:

1. The core body 10, which is made primarily from waste material, does not deform easily due to weather conditions, is environmental friendly and has a relatively low cost as compared to traditional furniture legs made entirely from wood.

2. There is no need for the furniture leg 100 to undergo various complicated operations so as to attain a desired shape, thereby resulting in a relatively low manufacturing cost.

3. The outer shell layer 30 and the inner cover layer 40 are made of wood to provide the furniture leg 100 with a pleasing and high quality appearance.

4. Since the furniture leg 100 is formed in a mold, the furniture leg 100 can be conveniently provided with different embossed patterns thereon. This is in contrast with traditional wooden furniture legs which require complicated cutting and grinding operations to form embossed patterns thereon.

6. The reinforcing sheet 32, includes crisscrossing and adhesively secured strips made from scrap wood material, the strips having grains that are transverse to each other. Hence, the reinforcing sheet 32 is capable of reinforcing the outer shell layer 30 to prevent tearing of the same due to the presence of tensile forces when the outer shell layer 30 is hot pressed for a second time to bond the same to the core body 10.

7. The outer shell layer 30, which is rigid, does not deform easily when it undergoes a second hot pressing operation to form the furniture leg 100. Thus, the outer shell layer 30 does not only enhance the appearance of the core body 10 but can also reinforce the latter.

8. The reinforcing block 20 has screw sockets 14 embedded therein, thereby obviating the need to bore screw holes in the furniture leg 100 when connecting the latter to other furniture parts. In addition, since the reinforcing block 20 is made of a hard wood material, damage to the furniture leg 100 can be avoided when connecting the same to other furniture parts.

10. Additional reinforcing pieces (not shown) may be embedded throughout the core body 10 to strengthen the latter.

11. The mold used in forming the furniture leg 100 is capable of trimming the excess portion (a) of the inner cover layer 40, thereby obviating the need to perform an additional trimming operation.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A composite furniture leg fastenable to a piece of furniture, said composite furniture leg comprising:

an elongate molded core body having outer and inner sides in relation to said piece of furniture, said molded body core being formed from a mixture of wood chips and a resinous binder;

a reinforcing block made of hard wood embedded in said core body at said inner side of said core body;

an outer laminate shell layer for covering said outer side of said core body; and an inner wood cover layer for covering said inner side of said core body;

said core body, said outer shell layer and said inner cover layer forming the furniture leg.

2. The composite furniture leg as claimed in claim 1, wherein said outer side of said core body has a curved longitudinal central portion and a pair of curved longitudinal shoulders on opposite sides of said central portion.

3. The composite furniture leg as claimed in claim 2, wherein said inner side of said core body is curved.

4. A composite furniture leg as claimed in claim 1, in which the reinforcing block is embedded in at least a top part of said core body at said inner side of said core body.

5. A composite furniture leg fastenable to a piece of furniture, said composite furniture leg comprising:

an elongate molded core body having outer and inner sides in relation to said piece of furniture, said molded core body being formed from a mixture of wood chips and a resinous binder;

a reinforcing block embedded in said core body at said inner side of said core body, said reinforcing block being made of hard wood;

an outer shell layer for covering said outer side of said core body, said outer shell layer being formed from a laminate which comprises a substrate sheet and a reinforcing sheet bonded to an inner side of said substrate sheet, said substrate sheet and said reinforcing sheet being made of wood; and an inner cover layer, made of wood, for covering said inner side of said core body;

said core body, said outer shell layer and said inner cover layer forming the furniture leg.

6. The composite furniture leg as claimed in claim 5, wherein said outer side of said core body has a curved longitudinal central portion and a pair of curved longitudinal shoulders on opposite sides of said central portion.

7. The composite furniture leg as claimed in claim 6, wherein said inner side of said core body is curved.

8. The composite furniture leg as claimed in claim 5, wherein said reinforcing block has at least one screw socket embedded therein.

9. The composite furniture leg as claimed in claim 5, wherein said reinforcing sheet comprises crisscrossing and adhesively secured strips.

10. The composite furniture leg as claimed in claim 9, wherein said strips have grains that are transverse to each other.

11. A composite furniture block as claimed in claim 5, in which the reinforcing leg is embedded in at least a top part of said core body at said inner side of said core body.

12. A composite furniture leg fastenable to a piece of furniture, said composite furniture leg comprising:
- an elongate molded core body having outer and inner sides in relation to said piece of furniture, said molded core body being formed from a mixture of wood chips and a resinous binder;
- a hard wood reinforcing block embedded in said core body at said inner side of said core body, said reinforcing block having at least one screw socket embedded therein;
- an outer laminate shell layer for covering said outer side of said core body; and
- an inner wood cover layer for covering said inner side of said core body;
- said core body, said outer shell layer and said inner cover layer forming the furniture leg.

13. A composite furniture leg as claimed in claim 12, in which the reinforcing block is embedded in at least a top part of said core body at said inner side of said core body.

14. A composite furniture leg fastenable to a piece of furniture, said composite furniture leg comprising:
- an elongate molded core body having outer and inner sides in relation to said piece of furniture, said molded core body being formed from a mixture of wood chips and a resinous binder;
- a hard wood reinforcing block embedded in said core body at said inner side of said core body;
- an outer shell layer for covering said outer side of said core body, said outer shell layer being formed from a laminate which comprises a substrate sheet and a reinforcing sheet bonded to an inner side of said substrate sheet and made of a same material as said substrate sheet; and
- an inner wood cover layer for covering said inner side of said core body,
- said core body, said outer shell layer and said inner cover layer forming the furniture leg.

15. The composite furniture leg as claimed in claim 14, wherein said reinforcing sheet comprises crisscrossing and adhesively secured strips.

16. The composite furniture leg as claimed in claim 15, wherein said substrate sheet and said reinforcing sheet are made of wood.

17. The composite furniture leg as claimed in claim 16, wherein said strips have grains that are transverse to each other.

18. The composite furniture leg as claimed in claim 14, in which the reinforcing block is embedded in at least a top part of said core body at said inner side of said core body.

* * * * *